May 20, 1941.  W. J. MEYER  2,242,727
WELDED BOLSTER AND CROSS-BEARER CONSTRUCTION
Filed Dec. 22, 1939  10 Sheets-Sheet 2

INVENTOR:
Wendel J. Meyer,
BY Paul & Paul
ATTORNEYS.

May 20, 1941. W. J. MEYER 2,242,727
WELDED BOLSTER AND CROSS-BEARER CONSTRUCTION
Filed Dec. 22, 1939 10 Sheets-Sheet 3

INVENTOR:
Wendel J. Meyer,
BY
ATTORNEYS.

May 20, 1941.  W. J. MEYER  2,242,727
WELDED BOLSTER AND CROSS-BEARER CONSTRUCTION
Filed Dec. 22, 1939  10 Sheets-Sheet 6

WITNESSES:

INVENTOR:
Wendel J. Meyer,
BY
ATTORNEYS.

May 20, 1941. W. J. MEYER 2,242,727
WELDED BOLSTER AND CROSS-BEARER CONSTRUCTION
Filed Dec. 22, 1939 10 Sheets-Sheet 7

WITNESSES:
INVENTOR:
Wendel J. Meyer,
BY
ATTORNEYS.

May 20, 1941.  W. J. MEYER  2,242,727
WELDED BOLSTER AND CROSS-BEARER CONSTRUCTION
Filed Dec. 22, 1939  10 Sheets-Sheet 8

WITNESSES:

INVENTOR:
Wendel J. Meyer,
BY
ATTORNEYS.

May 20, 1941.  W. J. MEYER  2,242,727
WELDED BOLSTER AND CROSS-BEARER CONSTRUCTION
Filed Dec. 22, 1939  10 Sheets-Sheet 10

WITNESSES:

INVENTOR:
Wendel J. Meyer,
BY
Paul Paul
ATTORNEYS.

Patented May 20, 1941

2,242,727

UNITED STATES PATENT OFFICE 2,242,727

WELDED BOLSTER AND CROSS-BEARER CONSTRUCTION

Wendel J. Meyer, Philadelphia, Pa., assignor to The Pennsylvania Railroad Company, Philadelphia, Pa., a corporation of Pennsylvania Application December 22, 1939, Serial No. 310,485

8 Claims. (Cl. 105—414)

This invention in its broader aspects relates to the underframing of railroad cars and, more particularly, to the fabrication of the bolster and cross-bearer units for assembly, as well as connection, to the center and side sills of such underframing.

In accordance with prevailing methods of applying welded bolsters and cross-bearers to railroad cars, it is customary to build up such members on the underframe, which entails the disadvantage of making the entire underframe as a unit, at a separate shop location, because the time involved in welding the constituent parts together renders such procedure impracticable on the car erection track. Another disadvantage arises from the conventional practice of welding the cross-bearers to the center and side sills, in that it has a pronounced tendency to damage the entire cross-sectional areas of said sills, as the welding heat applied at the junctures of the cross-members and sills tends to weaken said sills by introducing internal stresses and by changing the original composition of the metal.

The primary object of this invention is to overcome the above noted disadvantages of prevailing practice by provision of a novel assembly of the bolsters and cross-bearers relative to the center and side sills of car underframing, in which all welds at right-angles to the line of stress in such sills are substantially eliminated.

Another object of this invention is to reduce location-welding by provision of unit bolster and cross-bearer constructions which can be easily applied to a car underframe at the logical position of a conventional shop erection track without any delay in production.

A further object is the provision of a bolster and cross-bearer unit which can be easily attached to the center and side sills of car underframing without any appreciable reduction in the strength of such underframing sills.

A still further object is to so interconnect the bolster and cross-bearer units to the center and side sills of car underframing as to form an efficient structure without impairing the strength of any of the constituent parts.

Other objects and ancillary advantages of this invention will appear as the nature thereof is better understood, said invention consisting substantially in the novel arrangements and co-relation of parts hereinafter fully disclosed, illustrated by the accompanying drawings of typical embodiments and wherein similar reference characters are used to designate corresponding parts throughout the several views; while the concluding claims more particularly recite the features of novelty.

In the following detailed description of the embodiments of this invention shown by the accompanying sheets of drawings, specific terms will be employed for the sake of clarity; but it is to be understood that such terms are used in a descriptive sense and not for purposes of limitation. Each specific term employed herein is intended to embrace all technical equivalents which are susceptible of analogous interpretation.

Figure 1:
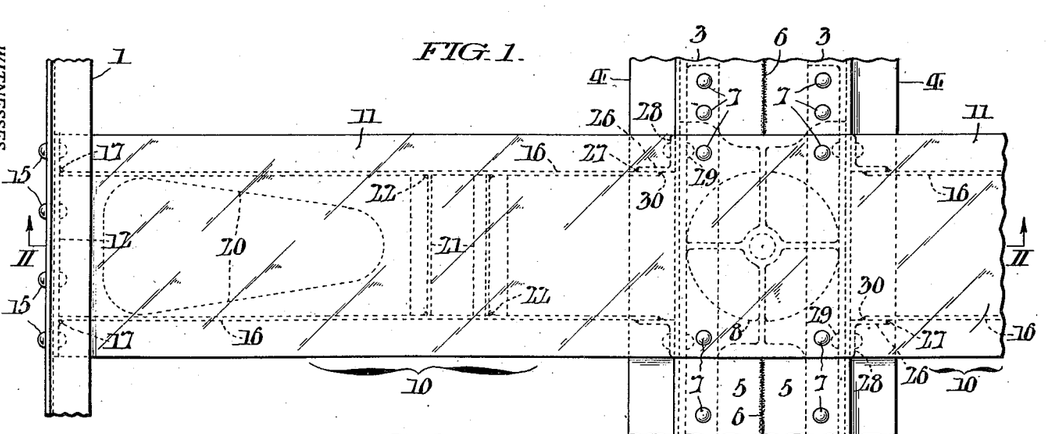
Fig. 1 is a fragmentary plan view of a railroad car underframe showing a typical bolster construction in accordance with this invention.
Figure 2:
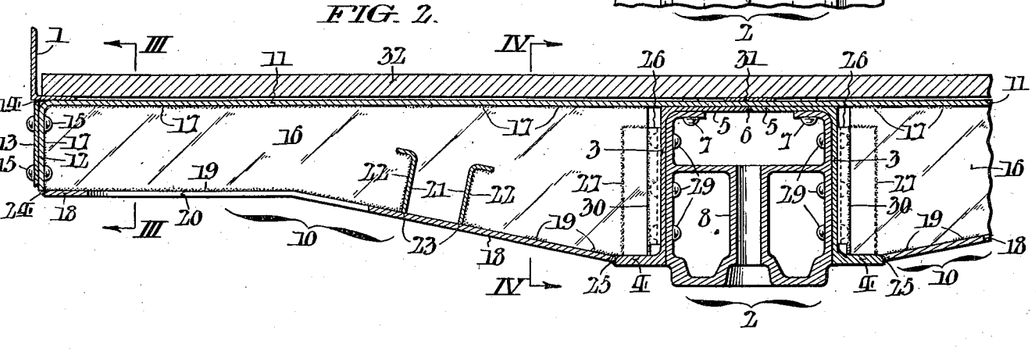
Fig. 2 is a vertical section on the plane II—II of Fig. 1, with the car flooring in place.
Figure 3:
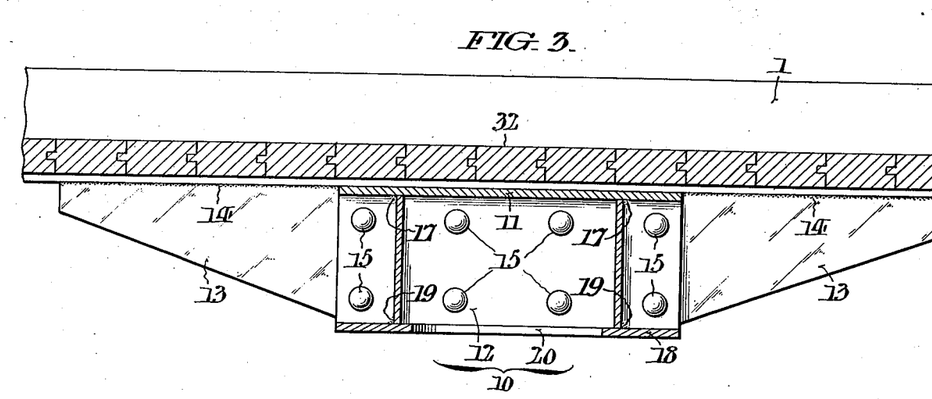
Fig. 3 is an enlarged section on the plane III—III of Fig. 2.
Figure 4:
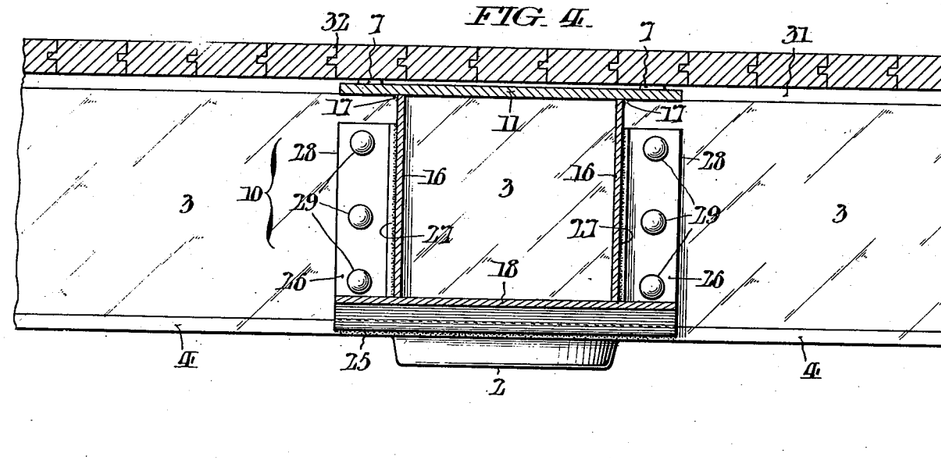
Fig. 4 is a similar section on the plane IV—IV in Fig. 2.
Figure 5:
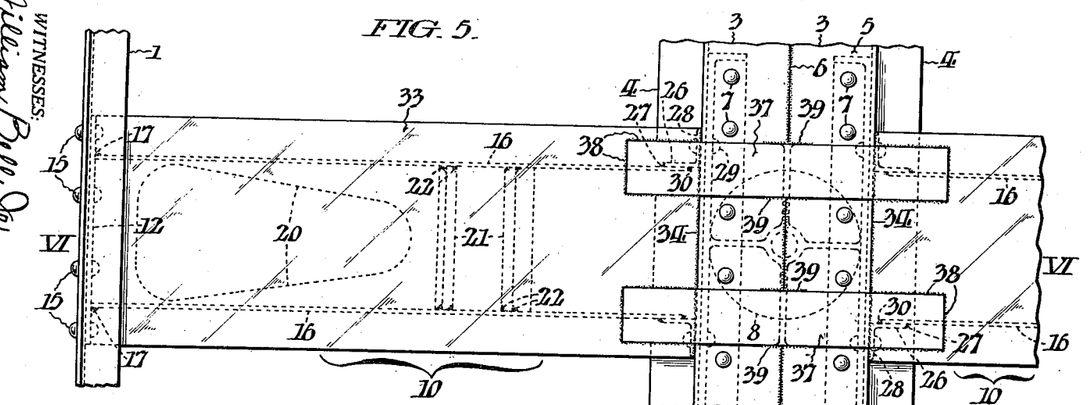
Fig. 5 is a fragmentary plan view similar to Fig. 1, but showing a different manner of connecting the bolster to the center and side sills.
Figure 6:
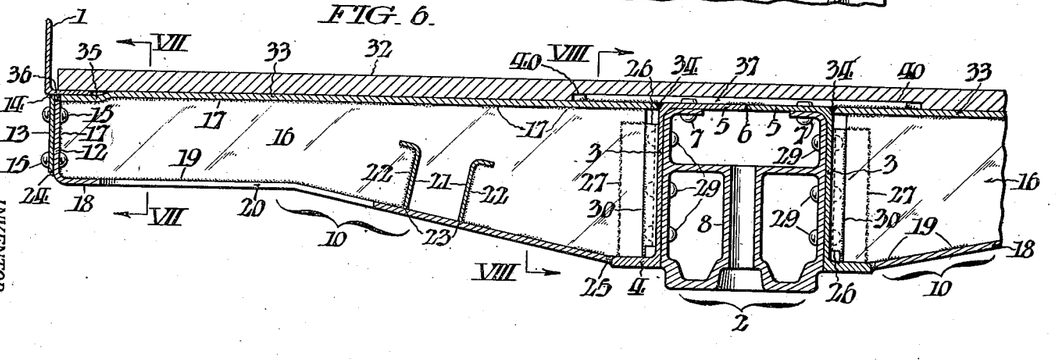
Fig. 6 is a vertical section on the plane VI—VI of Fig. 5, with the car flooring applied.
Figure 7:
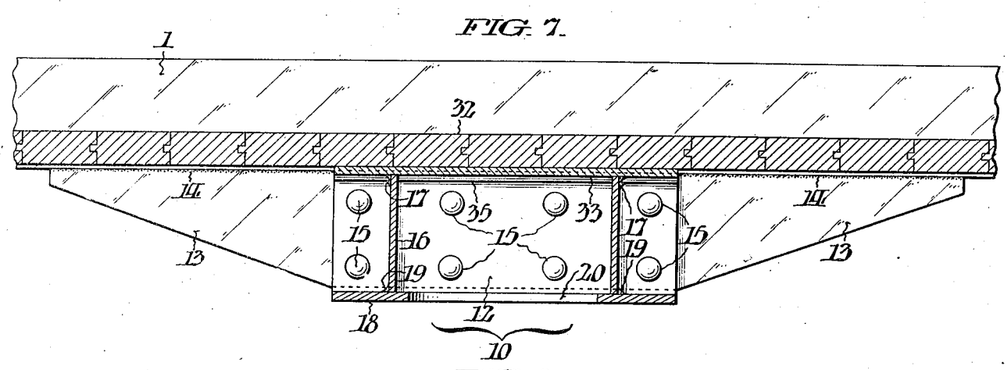
Fig. 7 is a relatively larger scale section as viewed in the direction of the arrows VII—VII of Fig. 6.
Figure 8:
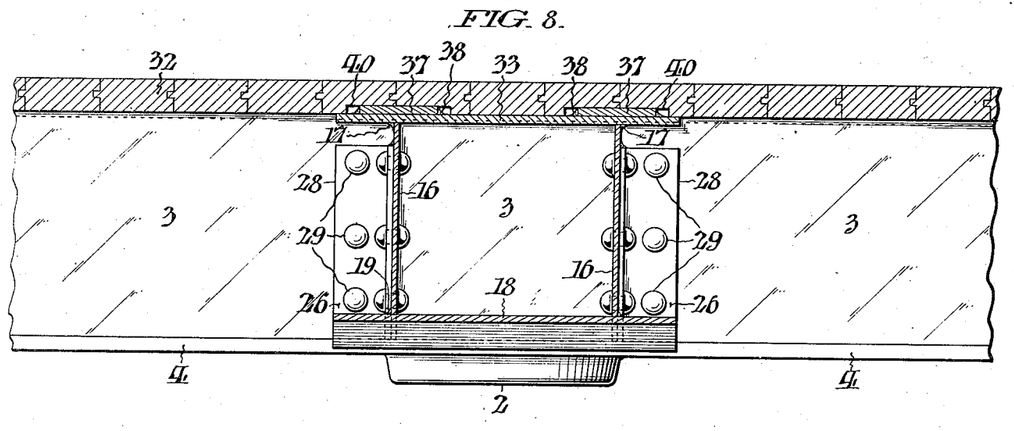
Fig. 8 is a similar section on the plane VIII—VIII of Fig. 5.
Figure 20:
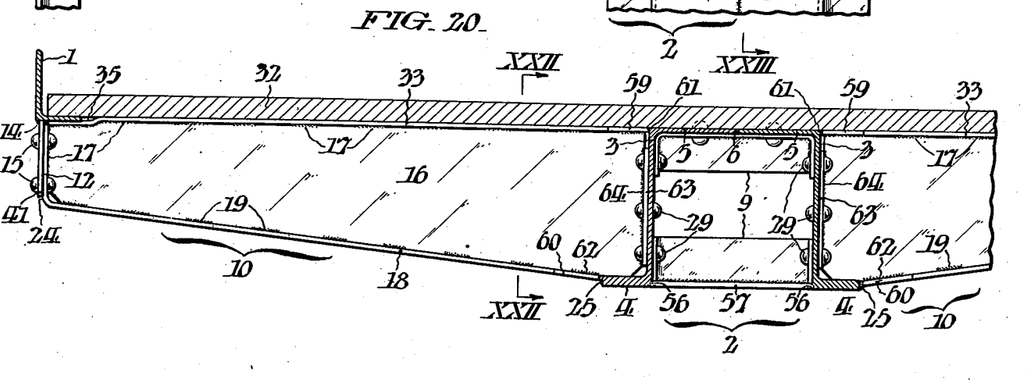
Fig. 20 is a vertical elevation, with certain parts shown in section, as viewed from below the preceding figure, with the car flooring in applied position.
Figure 21:
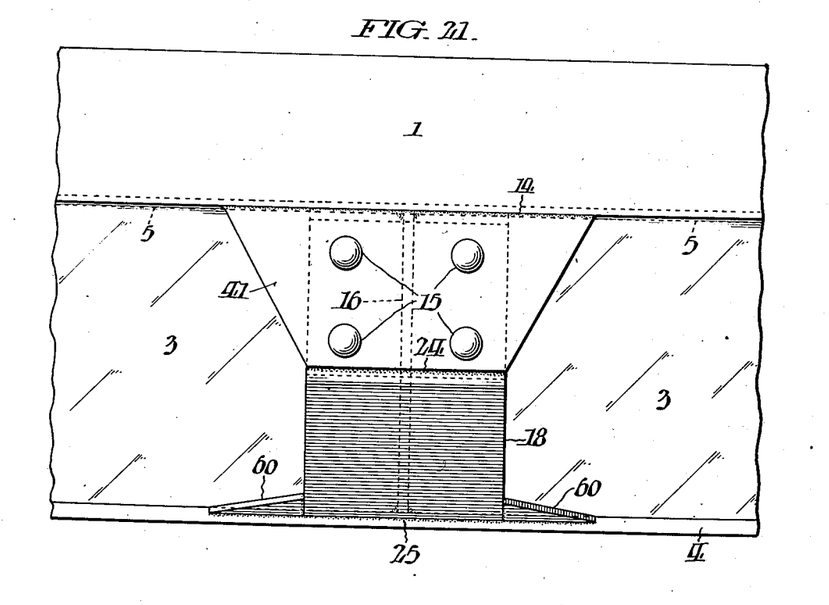
Fig. 21 is an end elevation looking from the left towards the right-hand of the preceding figure.
Figure 22:
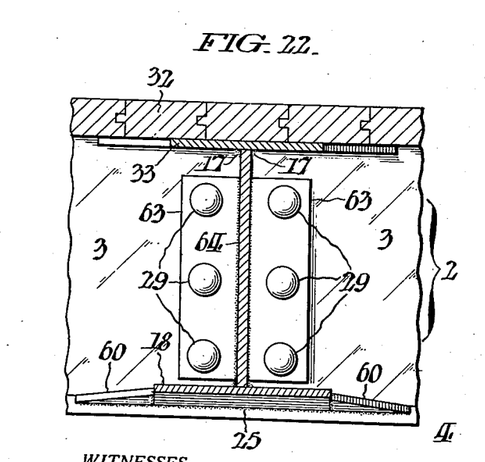
Fig. 22 is a vertical section, as viewed in the direction of the arrows XXII—XXII, Fig. 20; and, Fig. 23 is a similar section on the plane XXIII—XXIII of Fig. 19.
Figure 23:
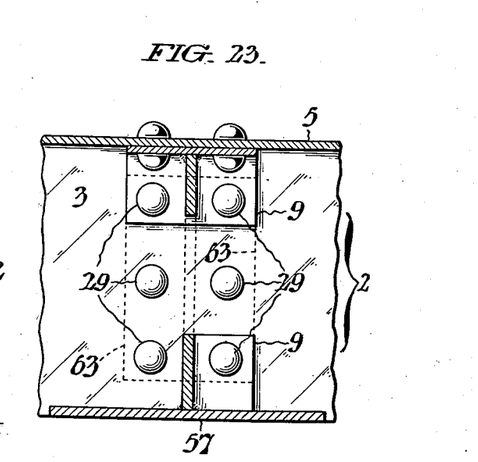

For the purpose of better illustrating this invention and its application to conventional car underframing including side and center sills 1, 2, respectively, the former consists of angle-sections and the latter of reversely disposed Z-sections 3, the lower flanges 4 whereof are substantially thicker than the upper flanges 5, and said sections being permanently connected along the upper flange abutting edges by a longitudinal weld 6, so that the resulting structure provides the inverted U-shaped center sill 2. In this center sill 2 is secured, as by rivets 7, the customary casting 8—see Figs. 2 and 6; or the usual tension members or web sections 9—see Figs. 10, 15 and 20, more particularly.

In carrying out the present invention, and referring first to Figs. 1–8, inclusive, which relate more particularly to bolster structures, it is to be noted the constructions shown permit said bolsters to be fabricated at a bench in aligned, relatively small units, comprehensively designated 10, which can be applied to the car underframe, including the sills 1, 2, at the logical position of a conventional shop erection track without delaying production. Each bolster comprises a top plate 11, which constitutes the tension chord of the bolster and extends across the car with each end suitably bent to define an angular flange 12 for registration with the vertical gusset plate 13 extending downwards from the side sill 1. The gusset plate 13 is located so that it can be united by a line weld 14, or otherwise secured, to the side sill 1 during the sub-assembly of the sides of the car, while the top plate flange 12 is preferably attached to said gusset plate by rivets 15. Each unit 10 also comprises spaced vertical components or web plates 16, of appropriate contour, which are permanently secured to the top plate 11 and end flange 12 by line welds 17; as well as a bottom plate 18 similarly attached to said web plates by line welds 19, with an elongated cut-out 20 to provide accessibility for insertion and bucking-up the rivets 15. At a predetermined location, between the side and center sills 1, 2, the web plates 16 are connected by inverted L-shaped brace members 21, permanently fixed in position by line welds 22, with the lower edge of said members seating on the bottom plate 18 at 23, so as to resist the upward thrust of the side bearing, not shown. In addition, the outer and inner end edges of the bottom plate 18 are united to the lower edge of the web end flanges 12 and to the Z-section lower flanges 4 by seam welds 24, 25, respectively.

When two of the units 10, constructed as described, are spacedly aligned and permanently secured to the top plate 11, by the welds 17, it will be readily seen that said top plate establishes the over-all length of the bolster and provides a "jig" which facilitates assembling and welding of the other parts of said bolster into a complete unit with a mid-clearance intervening the spaced web plates 16 for bridging the center sill 2. For attaching the bolster to the center sill 2, an angle 26 is, preferably, secured by a seam weld 27 along one of its flange edges to each of the inner end portions of the web plates 16 with the lower ends bearing on the Z-section flange 4. The other flange 28 of each angle 26 is disposed in spaced parallelism with respect to the edges of the web plates 16, and reversely directed outwards in a common lateral plane. The respective flanges 28 are provided with appropriately positioned holes for passage of some of the rivets 29 that attach the center sill casting 8, or the tension members 9, to the Z-sections 3. The application of the attaching angles 26 renders possible the choosing of a suitable gage or thickness therefor to ensure the proper bearing stress on the rivets 29; while it also furnishes a simple means of transmitting a portion of the bolster end-reaction to the center sill 2 by having the bottom ends of the angles 26 resting on the top surface of the center sill flanges 4. In addition, it is to be remarked the manner of attaching the bolster to the side and center sills 1, 2 causes no appreciable loss in the strength of said sills.

Seam welds 30 also unite the vertical inner edges of the web plates 16 to the attaching angles 26, for further strengthening the connection of said parts in permanent union; while on reference to the drawings it will be readily seen that the arrangement and connection of the component parts described makes it practicable to fabricate the entire bolster as a unit and then to slide it over the center sill 2 into its proper place, and thereafter secure it in position by means of the rivets 29, in an obvious manner. Furthermore, it will be understood that the seam welds 25 can be made after placement of the bolster in position and then inverting the car underframe, in accordance with known practice, so said welds may be made horizontally and thereby obviate overhead welding. Again the welded seams 25 connecting the bolster bottom plates 18 being under compression, therefore, may be safely stressed to a higher degree than welds which are subject to tension, and by the construction described there is no difficulty in ensuring proper weld areas. Moreover, the seam welds 25 being parallel to the lines of stress in the center sill 2, the effect of said welds on the strength of the sill 2 is negligible. 31 is a suitable strip longitudinally aligned over the center sill Z-section weld 6 for medially supporting the flooring 32, centrally intermediate the side sills 1.

Referring now to Figs. 5–8, inclusive, all parts having equivalents in the preceding description are designated by corresponding reference characters. In this form of the invention, it will be observed that the flooring 32 is laid directly on top of the center sill 2, thereby interfering with the application of a continuous bolster top plate 11, as shown in Figs. 1–4. In other words, in the modified structure of Figs. 5–8, each unit or sub-assembly 10 is provided with a top plate 33 having the inner end attached to the center sill 2 by a seam weld 34 connecting said top plate planarly to the confronting corner of said sill; as well as the welded seam 25 securing the bottom plate 18 to the sill flange 4 as before described. In addition, the bottom plate 18 is somewhat extended outwards and bent upwards to provide the end flange 12; and the top plate 33 has its outer end stepped at 35 for seating reception of the side sill 1; while the top edge of the flange 12 with the registering edge of the top plate 33 are united by a seam weld 36. Two butt straps 37 in spaced parallelism are joined to the top plates 33 and the upper surface of the center sill 2, by line welds 38, 39, respectively, to assist in transmitting the tensile stress across said center sill; while the flooring 32 is "routed-out" at 40 to clear the butt straps 37. In this form of the invention, it will also be observed all welds with the exception of the short ones 39 that connect the butt straps 37 to the top of the center sill 2, perpendicular to the line of stress in said center sill, have been eliminated.

Figure 9:
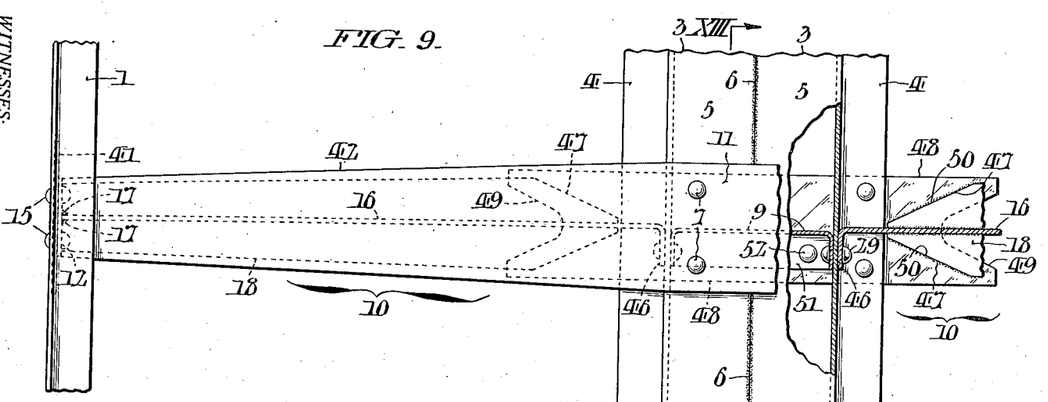
Fig. 9 is a broken plan view of a cross-bearer construction along the lines of the bolster shown by Fig. 1, but illustrating a variation in the connection of the cross-bearer web to the center sill and the arrangement of the bottom plates.
Figure 10:
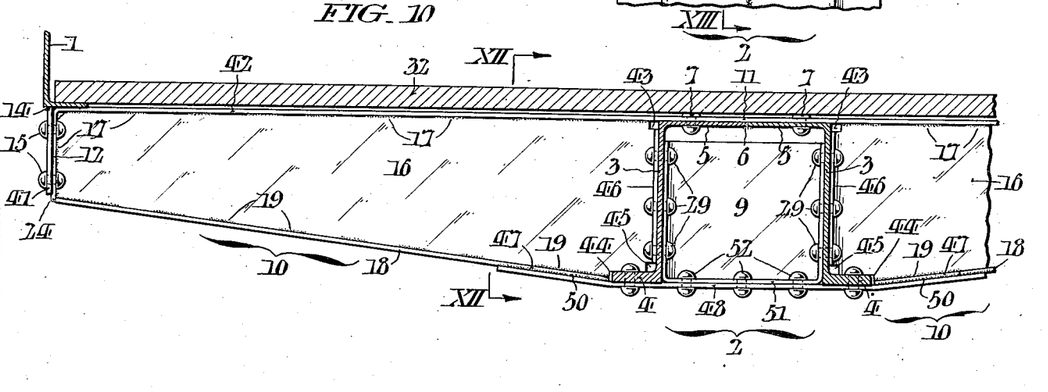
Fig. 10 is a vertical elevation, as viewed from below the preceding illustration, with the car flooring in place.
Figure 11:
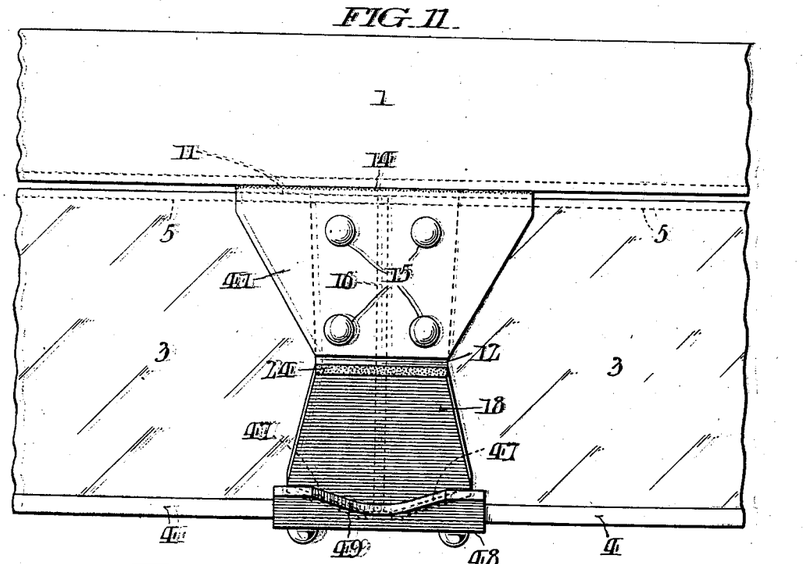
Fig. 11 is an end elevation of the cross-bearer, as viewed from the left-hand of Fig. 9.
Figure 12:
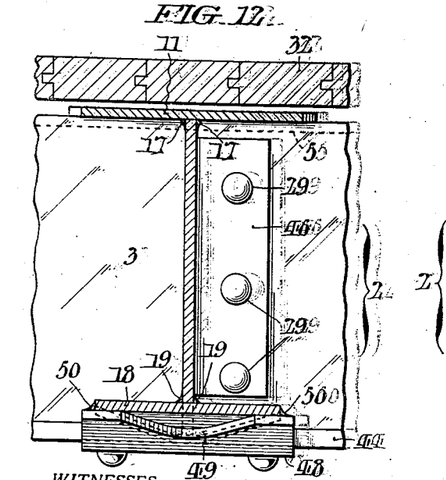
Fig. 12 is an enlarged cross-section on the plane XII—XII in Fig. 10.
Figure 13:
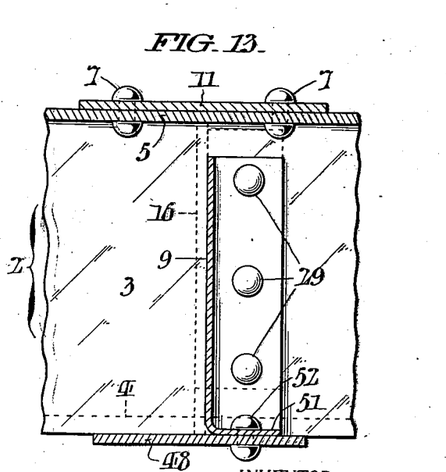
Fig. 13 is a vertical section on the plane XIII—XIII in Fig. 9.
Figure 14:
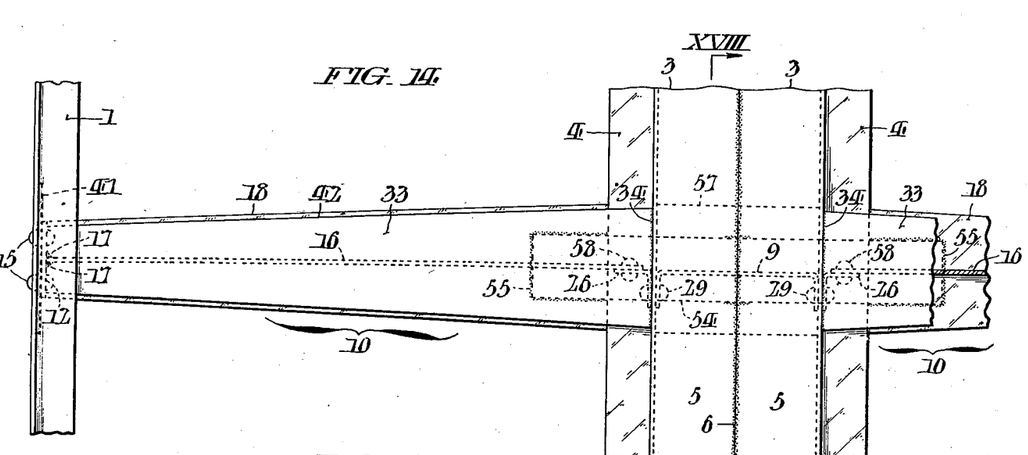
Fig. 14 is a plan view similar to Fig. 9, showing a variation in the cross-bearer which accommodates laying of the car flooring directly on top of the center sill.

In Figs. 9–13, which show the adaptation of this invention to a cross-bearer construction that is somewhat the same as illustrated by Figs. 1–4, inclusive, with the exception the gusset plate is of substantially less car length and is designated as 41 for purposes of differentiation in the following descriptive matter; while the top plate 11 of each unit 10 has the part 42 intermediate the top corner edges of the center sill 2, tapered outwards to the point of abutment with the gusset 41, as best understood from Fig. 9, and then bent down to provide the end flange 12, see Figs. 10 and 11. The attaching angles 26 before described are dispensed with, in this form of the invention, and in lieu thereof the unit web plate 16 is extended at its inner end with the upper edge cut away at 43 and the lower edge similarly cut out to define stepped parts 44, 45; while the relatively narrower part, thus defined is angled to provide a securing flange 46, which is apertured for passage of the rivets 29; whereas the part 44 accommodates the center sill flange 4. In addition, the bottom plate 18 has its inner end tapered, for a predetermined extent, as indicated at 47, Fig. 9, and said tapered parts of aligned units 10 are connected by a sub-plate 48 having the ends forked at 49 and permanently fixed to the tapered part 47 by line welds 50. The sub-plate 48 is also secured to the center sill flanges 4 and the bottom flange 51 of the web section 9 by attaching rivets 52. This arrangement of the several parts is very practicable for cross-bearers, because the reaction to be transmitted from the center sill 2 to the sides of the car is usually much lower than the reactions carried by bolsters; therefore the web plate 16 will usually provide sufficient rivet bearing area to safely carry the reactions of each cross-bearer unit 10. Furthermore, the sub-plate 48 serves to transmit the tensile stress across the center sill 2, and to permit horizontal welding of the bottom plate splices or seams without inverting the underframe.

Figure 15:
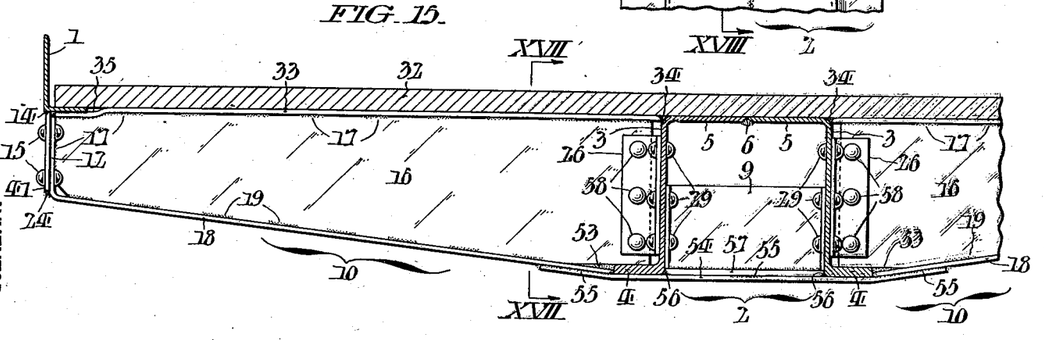
Fig. 15 is a vertical elevation, with certain parts shown in section, as viewed from below Fig. 14, with the car flooring applied.
Figure 16:
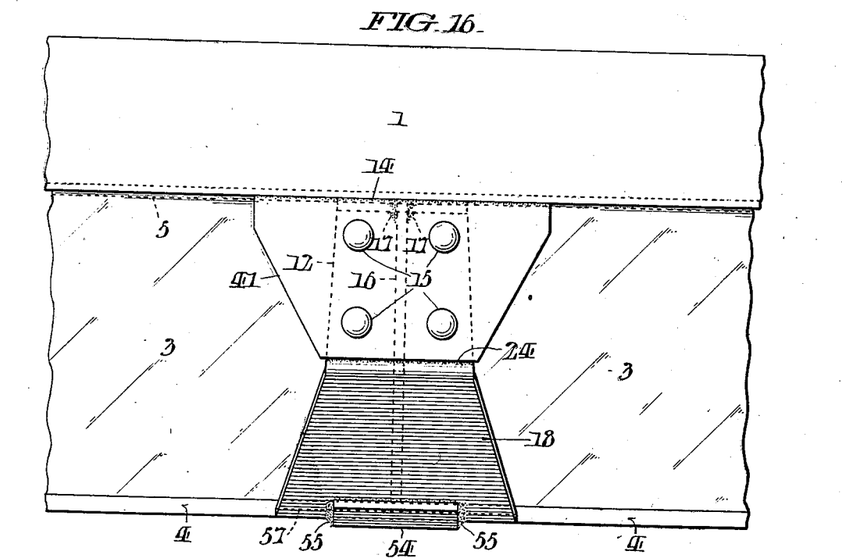
Fig. 16 is an end view looking from the left towards the right-hand of Fig. 15.
Figure 17:
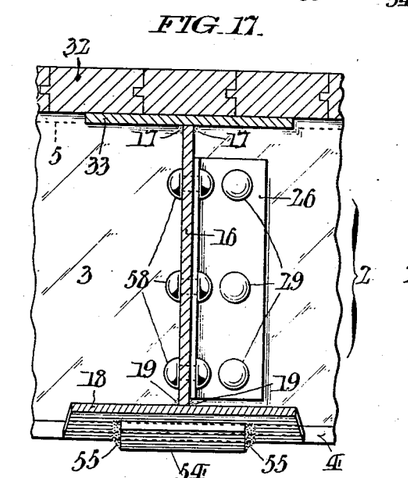
Fig. 17 is a cross-section on the plane XVII—XVII of Fig. 15.
Figure 18:
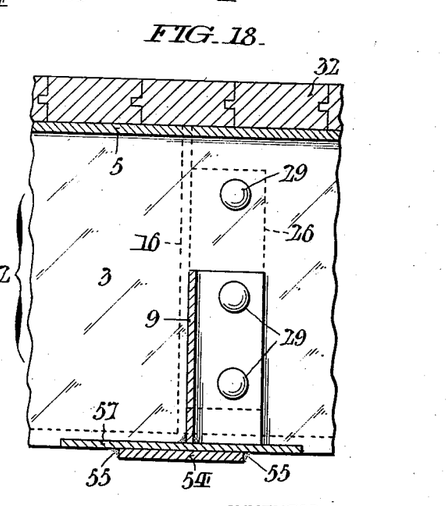
Fig. 18 is a similar section on the plane XVIII—XVIII of Fig. 14.
Figure 19:
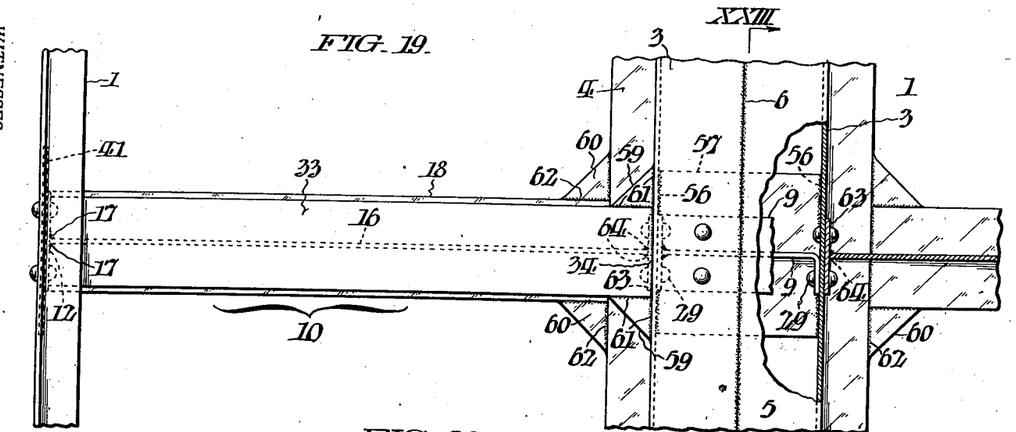
Fig. 19 is a plan view of a further modification of the cross-bearer construction in accordance with this invention, and having a portion broken out to better disclose the underlying structure.

Referring now to Figs. 14–18 which show a slightly modified form of cross-bearer construction that permits the flooring 32 to be laid directly on top of the center sill 2 similar to the bolster construction shown by Figs. 5–8, inclusive, with the following detail changes. The unit top plates 33 are connected to the center sill top edges by seam welds 34, as previously described, while the seam weld 53 between the bottom plates 18 and the sill flanges 4 are made somewhat heavier so as to align with the upper face of said flanges. Such connection is reenforced by a butt-strap 54 with line welds 55 and cross welds 56 connecting thereto an auxiliary tension-member 57, between the inner and lower corner edges of the sill Z-sections 3 and said strap, as best shown in Fig. 15, while the strap 54 serves to transmit tension across the center sill 2, as hereinbefore explained. In this form of the invention, inverting of the underframe is required to facilitate making the welds 56 and the welds 55 securing the butt-strap 54 in place. Furthermore, the attaching angles 26 are shown as secured to the unit web plate 16 by rivets 58 in this form of cross-bearer construction, as clearly understandable from the drawings.

Figs. 19–23, inclusive, show a variation of the cross-bearer construction described in the preceding paragraph, wherein triangular gussets 59, 60 are respectively applied, and connected by seam welds 61, 62, in the corner junctures between the unit upper and lower plates 33, 18 and the center sill 2. Furthermore, instead of the attaching angles 26 being used, a foot-plate 63 is united by welds 64 to the inner end edge of the unit web plate 16, said plate having spaced holes for passage of securing rivets 29 through the web portions of the Z-sections 3 forming the center sill 2, in the manner hereinbefore fully set forth. Also it is to be noted the upper tension member or "spreader" 9 abuts the underside and is secured by rivets to the upper flanges 5 of the center sill to reinforce and prevent buckling of said flanges under compression loads transmitted by the top plates 33 of the cross bearers 16.

From the foregoing disclosure it will be seen that there is provided a bolster and cross-bearer construction, the components whereof are so formed and interrelated that their cooperative action results in a sturdy and compact structure, capable of resisting all normal strains and stresses to which car underframes are generally subjected.

While there has been shown and described different forms of bolster and cross-bearer constructions in accordance with the fundamentals of this invention, it is to be borne in mind the same are not conclusive, hence it is to be understood other applications and detail changes incident thereto, which do not depart from the generic aspects of said invention, are included insofar as the terminology of the following claims permits and the state of the prior art proscribes.

Having thus described my invention, I claim:
1. A body bolster or cross-bearer unit, for car underframing including a center sill embodying lower flanking flanges and side sills having depending spaced gussets longitudinally aligned with and seam welded to such side sills, said unit comprising a vertical web plate, transversely-related plates line-welded to the upper and lower lengthwise edges of said web plate, one of the transverse plates having an extension bent into lapping engagement against and similarly secured to the web plate end edge, said extension also abutting the confronting side sill gusset, a seam weld uniting such extension to the registering edge of the other transverse plate, a seam weld uniting the lower transverse plate other end edge to the adjoining center sill flanking flange, and means for attaching said unit to the side sill gusset and the center sill.

2. A body bolster construction for car underframing, including a center sill of inverted channel formation embodying lower lateral-flanges and angle-section side sills having dependent gussets longitudinally aligned with and seam welded to said side sills, characterized by aligned cross-bearer units; each such unit embodying spaced vertical web plates, transversely related plates line-welded to the upper and lower longitudinal edges of said web plates, one of the transverse plates having an end extension bent into lapping engagement against and similarly secured to the spaced web plate outer end edges, said extension also abutting the confronting side sill gusset; a seam weld connecting the bent end extension to the registering edge of the other transverse plate; seam welds uniting the respective lower transverse plate inner ends to the adjoining center sill lower lateral-flange edges; and means for attaching said aligned units to the respective confronting side sill gussets and the center sill channel-forming walls.

3. The bolster construction of claim 2, characterized by a common transversely related upper plate having the end portions bent down into lapping abutment against the ends of the vertical web plates, said upper plate bent ends abutting the confronting side sill gussets, and such upper plate providing a continuous tension chord member across the car underframe between the side sills.

4. The bolster construction of claim 2, wherein the transversely related respective upper plate inner end edges are co-planarly seam welded to the adjoining top corner edge of the center sill, the vertical web plates have their upper outer edges notched-out, the transverse upper plate overlying portion being depressed onto said notched-out parts for co-planar seating of the side sill and to buttress the latter against transverse disruption, the transversely related lower plates are extended and upwardly bent into abutment against the outer end edges of the associated web plates, and seam welds unite the upwardly bent extension edges to the registering outer edges of the upper plate depressed portions.

5. The combination of claim 2, characterized by spaced reversely-directed and inverted L-shaped brace plates united by seam welds to the web plates at an intermediate position.

6. The combination of claim 1, wherein the units are characterized by a common permanently connected transverse upper plate, and the portions of said upper plate as well as the corresponding parts of the lower transverse plates are longitudinally tapered from the center sill to the side sills.

7. The combination of claim 1, wherein the inner portion of each unit lower transversely-related plate is beveled towards the center sill flanking flange for overlap and line welding to a common connector sub-plate, whereby said parts are reinforced against relative shearing.

8. In a car underframe including an inverted channel-section center sill with the paralleling walls having relatively thicker bottom flanges, and side sills including spaced dependent longitudinally-aligned gussets seam welded to said sills, the combination of a cross-bearer construction comprising aligned units between the side and center sills, each such unit comprising a web plate, transversely-related flange-defining plates medially line-welded to the upper and lower edges of said web plate, one of said flange-defining plates being extended and bent into overlapping engagement with and united to the web plate outer end edge to define an attaching flange for abutment against the confronting side sill gusset, a seam weld connecting the terminal edge of said attaching flange to the registering end edge of the other flange-defining plate; the web plate inner ends seated on the adjoining center sill flanking flange; and means connecting the aligned units to the side sill gussets and center sill channel-section spaced walls and bottom flanges.

WENDEL J. MEYER.